United States Patent

[11] 3,601,316

| [72] | Inventor | Jerome L. Murray |
| | | 652 1st. Ave., New York, N.Y. 10016 |
| [21] | Appl. No. | 817,084 |
| [22] | Filed | Apr. 17, 1969 |
| [45] | Patented | Aug. 24, 1971 |

[54] COMBINED NOZZLE AND SPRINKLER
2 Claims, 3 Drawing Figs.

[52] U.S. Cl. .................................................. 239/222.17, 239/289
[51] Int. Cl. .................................................. B05b 3/04
[50] Field of Search .................................. 239/214, 222.11, 223, 224, 263, 222.17, 383, 461, 289, 582, 581, 71, 73, 74, 222, 456, 458; 285/13, 14; 137/583

[56] References Cited

UNITED STATES PATENTS

| 647,488 | 4/1900 | Funk et al. ................. | 137/583 |
| 898,759 | 9/1908 | Melavin ....................... | 239/458 |
| 941,652 | 11/1908 | Rock .......................... | 137/583 |
| 1,873,622 | 8/1932 | Morgan ....................... | 239/383 |
| 2,624,559 | 1/1953 | Hyde ........................... | 239/383 |
| 3,111,273 | 11/1963 | Mei ............................. | 239/458 |

Primary Examiner—M. Henson Wood, Jr.
Assistant Examiner—Edwin D. Grant
Attorney—Allison C. Collard ABSTRACT: A nozzle with a tubular body forming a waterway with an orifice at its forward end and a tubular member telescoping over the body and having a forward portion to receive liquid and a backward portion surrounding said body and formed with an inwardly facing cylindrical surface of greater diameter than the portion of the body opposite said surface, means at the forward end to control the liquid discharge through said orifice, the tubular member being movable along the body to adjust the position of the orifice relative to the control means and thereby vary the discharge of the liquid, and an elastic sealing ring surrounding and held in a relatively fixed position on the body.

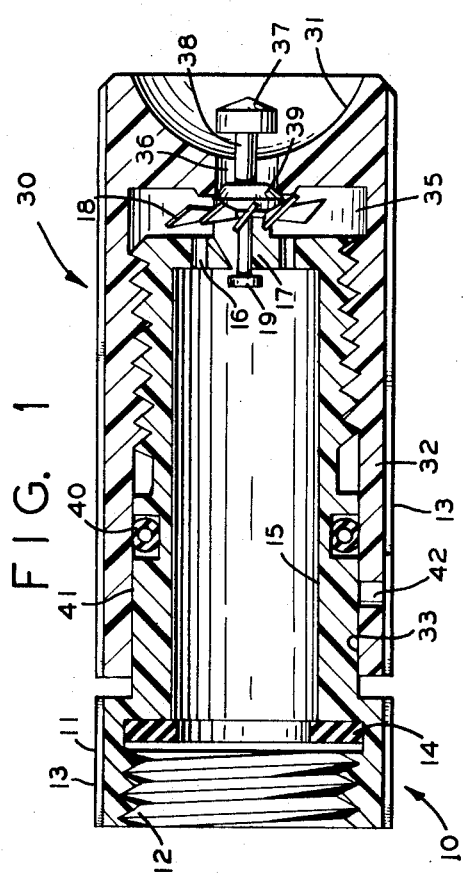
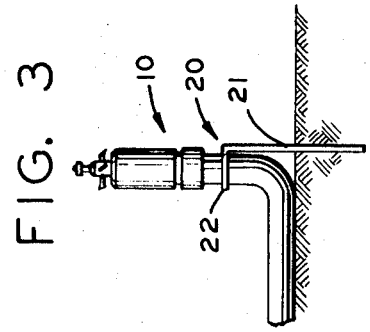
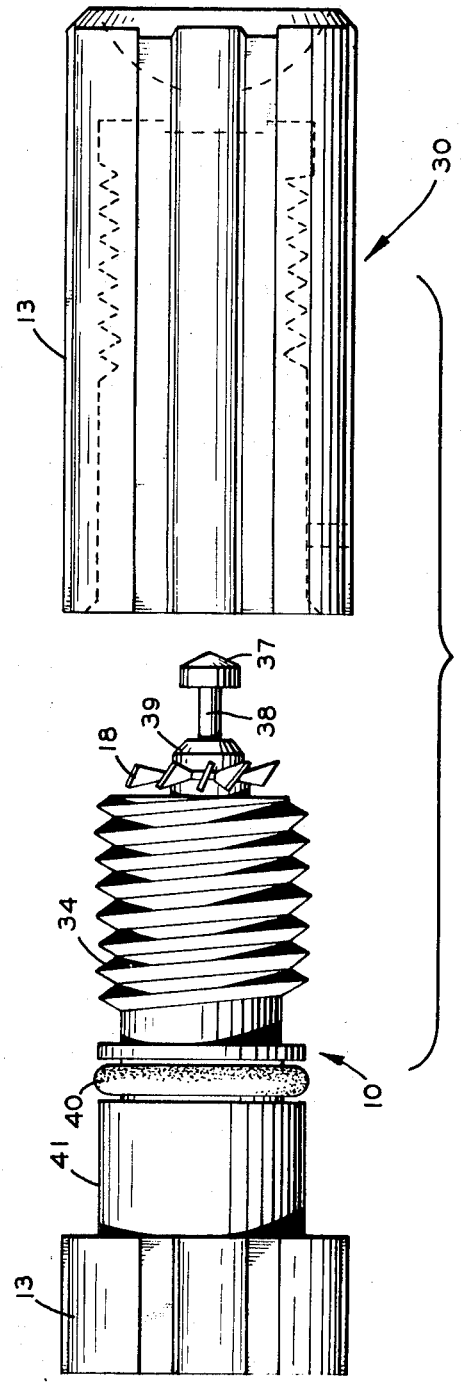
INVENTOR.
JEROME L. MURRAY
BY
JOHN P. CHANDLER
HIS ATTORNEY.

COMBINED NOZZLE AND SPRINKLER

This invention relates generally to devices for directing a flow of a liquid and, in particular, to nozzles and sprinklers for use with garden hoses or the like.

Common nozzles of the garden hose-type comprise a tubular member and another tubular member adapted to telescope over and be moved along the first tubular member to thereby vary the character of the liquid stream issuing from the nozzle. Because of the relative movement between the two members, it is necessary to provide a sliding liquid seal between the members to prevent leakage of liquid between the members in any position of the one member relative to the other. The structures providing these seals in conventional nozzles make use of several parts which are separate from the telescoping tubular members and which cooperate with the telescoping members to form the liquid seal. These parts add considerably to the cost of manufacturing the nozzle, both by the fact of their number and by the fact that they, as well as the tubular members, must be formed of relatively expensive material. In addition, these conventional nozzles often are or become defective, in that leakage of liquid develops between the two tubular members of the nozzle.

In addition to the above-mentioned shortcomings of common hose nozzles, none of them so far as I am aware is made to serve any function other than the projection of an adjustable liquid stream or spray from the nozzle. In yard and garden work, however, a continued scattered sprinkling of water over a large area, as well as a directed spraying of water by use of a nozzle, is often desired. For the sprinkling function, a separate sprinkler device is ordinarily required.

Accordingly, it is an object of the present invention to provide a nozzle of the garden hose type which is inexpensive to manufacture, being comprised of comparatively few parts and the principal parts being readily moldable from inexpensive plastic material.

It is another object of the present invention to provide a simple nozzle of the garden hose type so constructed that leakage of liquid will not occur or develop between the relatively movable tubular members of the nozzle.

A further object of the present invention is to provide a device for directing the flow of a liquid which is capable of functioning, alternatively, both as a sprinkler and as a nozzle.

The present invention provides a nozzle composed of two principal parts, an inner and an outer tubular member which are assembled in telescoping relation and relatively movable to adjust the discharge of liquid from the outer member, and the outer member is formed with an inwardly facing true cylindrical surface which engages and will move at all times in sealed relation to an elastic sealing ring, such, for example, as an O-ring mounted in a relatively fixed position on a portion of the inner member, with which portion the ring keeps itself in constantly sealed relation.

Thus, as the outer member moves along the inner member, the O-ring fixed to the inner member bears elastically against the cylindrical surface of the outer member to provide an extraordinarily effective liquid seal between the members in any of their relative positions. The seal does not require that either of the tubular members be finely machined, and since it does not employ any tightly squeezed packing element, there is no requirement that the coacting elements of the nozzle be able to withstand any great amount of stress. The telescoping members of the nozzle of the present invention may thus be molded of an inexpensive plastic material, thereby considerably reducing the cost of producing the nozzle. This cost is further reduced by the fact that the only sealing member required, in addition to the telescoping members themselves, is an inexpensive, commercially available O-ring.

The O-ring will retain a substantially circular cross-sectional shape, and thus remain in sealing engagement with the outer tubular member, despite repeated relative movement between the members. Further, since only the outermost peripheral portion of the O-ring is engaged by the moving outer member, the wear on the ring and the resistance offered by the ring to relative movement of the members are very slight. The present invention thus provides a nozzle having an effective and durable liquid seal between the relatively movable members thereof.

According to another aspect of this invention, a sprinkler device is mounted on one end of a tubular member and a second tubular member is detachably secured to the first tubular member so as to form beyond that one end of the first member a chamber enclosing the sprinkler device, so that when the two tubular members are secured together and liquid under pressure is supplied through the first member, the liquid flows into the chamber and past the sprinkler device from where it is discharged, in the manner of nozzle, through an outlet orifice in the second member, and when the second member is removed from the first member, the liquid under pressure supplied through the first member is broken up and scattered by the sprinkler device as a finely divided spray.

Hence, by simply removing the second tubular member from the first, the device of the present invention is converted from a nozzle to a sprinkler, and by reattaching the second member to the first, the device is reconverted from a sprinkler to a nozzle. The present invention thus provides a simple, easily manufactured, and easily manipulated device which is capable of performing the functions of both a nozzle and a sprinkler.

Other objects and features of the invention will become apparent from the following detailed description of the invention and from the accompanying drawing which illustrates a preferred form of a combined nozzle and sprinkler device embodying the features of the invention:

FIG. 1 is an axial cross-sectional view of the device with its parts in fully assembled relation;

FIG. 2 is a side elevational view showing the tubular members detached, one from the other;

FIG. 3 is a view of the device in use as a sprinkler.

The combined nozzle and sprinkler as shown in the drawings includes a body member 10 and a cap member 30 adapted to be detachably secured to the body member. The body member 10 is tubular and includes a radially enlarged end portion 11 having internal threads 12 by which the body member may be attached to a means for supplying liquid under pressure such, e.g., as an ordinary garden hose. Raised ribs 13 formed on the exterior surface of the enlarged portion 11 enable that portion to be firmly gripped in the hand of the user so as to facilitate attachment of the body member to the hose, and a resilient washer 14 housed in the enlarged end portion 11 provides a liquid seal between the body member and the hose.

The liquid supplied to the body member flows through a bore 15 in the member and is delivered from the member through a series of circularly arranged holes 16 formed in an end wall 17 thereof. The liquid flowing through the holes 16 strikes the angled blades of a sprinkler wheel 18 rotatably mounted on a stem 19 mounted to and extending from the end wall 17. The liquid striking the angled blades of the sprinkler wheel 18 causes that wheel to rotate on the stem 19, and the rotation of the wheel in turn causes the liquid to be broken up into tiny particles. With the cap member 30 removed from the body member, as shown in FIGS. 2 and 3, the liquid particles created by the rotative movement of the sprinkler wheel are scattered radially from the wheel in a broad sprinkling pattern.

As shown in FIG. 3, when the device is to be used as a sprinkler (i.e. with the cap member 30 removed) the body member 10 may be fixed in a desired sprinkling position by any suitable means; for example, by a stiff wire holder 20 formed with a spike end 21 to be inserted in the ground and with a looped portion 22 to engage and hold a part of the hose near the body member.

The cap member 30 is tubular and includes a wall 31 at one end of the member and an internally threaded portion 32 extending from the end wall 31 toward the open other end of the member. A true cylindrical surface 33 is formed on the inside surface of the member and extends from the threaded portion 32 to the open other end of the member. The cap member fits over the body member and is secured to that member by engagement of the threaded portion 32 with threads 34 on the body member 10. The threads 34 are formed on a portion of the outside surface of the body member extending from the wall 17 thereof toward the end portion 11 thereof. The cap member, when secured to the body member, forms beyond the end wall 17 of that member a chamber 35 into which the liquid delivered from the body member through the holes 16 flows. The fluid entering this chamber is discharged therefrom through an outlet orifice 36 formed in the end wall 31 of the cap member.

The outlet orifice 36 coacts with a needle portion 37 of a male valving element 38, formed as an extension of the stem 19, to determine the character of the liquid flow discharged from that orifice. It will be seen that by turning the cap member 30 relative to the body member 10, the cap member 30, by virtue of the interaction of the threaded portion 32 and the threads 34, will move along the body member 10 and thereby vary the position of the outlet orifice 36 relative to the needle portion 37 and accordingly vary the character of the liquid flow discharged from the outlet orifice. The inward movement of the cap member 30 relative to the body member 10 is limited by a seat portion 39 formed on the valving element 38 between the stem 19 and needle portion 37. This seat portion, in the extreme telescoped position of the cap member on the body member, seats the inner edge of the outlet orifice 36 so as to form a liquid seal therewith and thereby shut off the discharge of liquid through that orifice. The cap member, like the enlarged portion 11 of the body member, has raised ribs 13 formed on the exterior surface thereof to enable that member to be firmly gripped in the hand of the user so as to facilitate the turning of the cap member on the body member, as well as the removal of the cap member from the body member.

When the device is to be used as a nozzle, (i.e., with the cap member secured to the body member) it is necessary to provide a sliding liquid seal between the cap and body members effective to prevent leakage of liquid therebetween. For this purpose, a sealing ring 40 is seated in a groove formed in a smooth shank portion 41 of the body member 10. The sealing ring 40 is preferably an O-ring having a maximum diameter slightly larger than that of the cylindrical surface 33 of the cap member so that it bears elastically against that surface as the cap member is moved along the body member so as to provide a liquid seal between the body and cap member in any position of the cap member relative to the body member. Preferably, the O-ring has a relaxed inner diameter somewhat less than that of the bottom of the groove so that, when fitted into the groove, the inner surface of the ring is tensioned against the bottom of the groove so as to form a tight seal therewith. With the ring thus elastically fitted into the groove, it is extremely resistant to radially outward displacement and, as a result, will not readily be urged out of the groove and will remain in sealing engagement with both the bottom of the groove and the cylindrical surface 33 despite repeated movements of the cap member along the body member. The inherent characteristic of an O-ring to retain a substantially circular cross-sectional shape even when subjected to deforming forces further insures that the sealing contact between the ring and the cylindrical surface 33 will not be broken as a result of relative movement between the cap and body members.

Further, since only the outer peripheral portion of the O-ring engages the cylindrical surface, the frictional resistance offered by the ring to movement of the cap member along the body member is slight and the wear on the O-ring as a result of that movement is correspondingly slight.

The seal thus provided does not require that either the cap or body member be machined, nor is it essential to the effectiveness of the seal that they be able to withstand any substantial amount of stress. As a result, both the cap and body members may be molded from inexpensive plastic material. The sprinkler wheel may also be molded from suitable plastic material.

Since the seat portion 39 of the valving element 38 must have superior wear qualities to prevent eventual leakage of liquid past that portion with the cap and body members in their fully telescoped or "off" position, the valving element should preferably be formed of a wear resistant material such, for example, as a suitable metal or alloy.

If desired, a small bleeder orifice 42 may be provided through the cylindrical wall of the cap member at a location near the open end of that member where it will pass beyond the O-ring before disengagement of the threads 34 and threaded portion 32 and thereby produce a warning liquid flow through the orifice before detachment of the cap member from the body member. The bleeder orifice thus provides a means of warning the user of the nozzle that the cap member is about to become detached and thus reduces the possibility of the user being accidentally exposed to the broad sprinkling action of the sprinkler wheel.

It will thus be seen that the present invention provides a nozzle of the garden hose type which is effective and durable yet which, by virtue of the small number of parts required and the ease with which these parts may be produced and assembled, is simple and inexpensive to manufacture. The present invention further provides a nozzle which is capable of performing all of the functions of a conventional nozzle but which additionally is capable of functioning as a sprinkler thereby eliminating the need for a separate sprinkler device.

I claim:

1. A combined nozzle and sprinkler comprising a tubular body forming a passageway for a supply of liquid under pressure and having a wall at one end thereof, said wall having a series of holes therein for the delivery of liquid from said body, a tubular member telescoping over said body, said body and said member each being composed of a molded plastic material, said member having a forward portion forming beyond said one end a chamber to receive liquid from said body and having a backward portion surrounding said body and formed with a threaded section and, backwardly of said section to an open rear end of said member, with an inwardly facing true cylindrical surface of greater diameter than the portion of said body encompassed by said member, an outlet orifice in said forward portion for discharging liquid from said chamber, a male valving element mounted on said one end and coacting with said orifice to control the liquid discharge through said orifice, said body portion being formed with a threaded section coacting with the aforesaid section to detachably secure said member and said body together and for moving said member along said body by rotation of said member to adjust the position of said orifice relative to said control means and thereby vary the discharge of the liquid, said body portion having a circumferential groove formed in its outer surface backwardly of its threaded section at a location opposite said cylindrical surface, an elastic O-ring elastically fitted into said groove with its inner surface tensioned against the bottom of the groove in sealed relation thereto, the outer surface of said ring being slightly greater in diameter than said cylindrical surface and bearing elastically in sealed relation against the latter so that said member and said body are kept sealed together in all their relative positions as said member is moved to vary the liquid discharge, and a sprinkler wheel mounted for rotation in said chamber on said one end between said valving element and said wall and including a circumferential series of radially extending vanes disposed in and at an angle to the path of the liquid delivered from said holes so as to be rotated by and to break up the flow of such liquid, whereby when said member and said body are assembled together they constitute an adjustable nozzle for projecting a variable flow of liquid from said outlet orifice and when said member is removed said body and said wheel constitute a sprinkler to produce a scattered liquid spray.

2. The combined nozzle and sprinkler as recited in claim 1. wherein said tubular member includes a bleeder orifice disposed in its backward portion between its threaded section and its open rear end to permit a small liquid discharge to serve as a warning before detachment of said tubular member from said tubular body.